US008287035B2

(12) United States Patent
Bufe et al.

(10) Patent No.: US 8,287,035 B2
(45) Date of Patent: Oct. 16, 2012

(54) FRAME STRUCTURE FOR A MOTOR VEHICLE

(75) Inventors: Ronny Bufe, Rüsselsheim (DE); Stefan Gloger, Mühltal (DE); Jens Hartmann, Flörsheim (DE); Matthias Schlelein, Bodenheim (DE); Matthias Seyfried, Bodenheim (DE); Ralph Stenger, Mainhausen (DE); Dirk Strehl, Weiterstadt (DE); Joachim Köhr, Neustadt (DE); Heinz-Günter Lang, Budenbeim (DE); Hans-Joachim Patschicke, Büttelborn (DE)

(73) Assignee: GM Global Technology Operations LLC, Detroit, MI (US)

( * ) Notice: Subject to any disclaimer, the term of this patent is extended or adjusted under 35 U.S.C. 154(b) by 573 days.

(21) Appl. No.: 12/427,507

(22) Filed: Apr. 21, 2009

(65) Prior Publication Data

US 2009/0289476 A1 Nov. 26, 2009

(30) Foreign Application Priority Data

Apr. 24, 2008 (DE) .......................... 10 2008 020 527

(51) Int. Cl.
*B62D 25/20* (2006.01)
*B62D 21/02* (2006.01)
(52) U.S. Cl. .............. 296/203.01; 296/193.07; 296/192; 296/198; 296/204
(58) Field of Classification Search ............. 296/187.08, 296/187.11, 187.12, 193.05, 193.07, 198, 296/203.01, 204, 203.03, 203.04, 97.22, 296/192, 193.02
See application file for complete search history.

(56) References Cited

U.S. PATENT DOCUMENTS

| | | | | |
|---|---|---|---|---|
| 2,213,010 A * | 8/1940 | MacPherson | ............ | 296/203.01 |
| 2,240,022 A * | 4/1941 | Saives | ........................... | 280/797 |
| 2,538,839 A * | 1/1951 | Limberg | ........................ | 296/198 |
| 4,875,733 A * | 10/1989 | Chado et al. | ............. | 296/203.04 |
| 4,909,565 A * | 3/1990 | Harasaki et al. | .......... | 296/187.09 |
| 5,002,333 A * | 3/1991 | Kenmochi et al. | ............. | 296/204 |
| 5,611,593 A * | 3/1997 | Fukagawa et al. | ............. | 296/204 |
| 5,997,068 A * | 12/1999 | Matsushita | ..................... | 296/63 |
| 6,033,006 A * | 3/2000 | Bovellan et al. | ........... | 296/97.22 |
| 6,305,733 B1 | 10/2001 | Rahmstorf et al. | | |
| 6,431,641 B2 * | 8/2002 | Miyasaka | ................. | 296/203.03 |
| 6,705,667 B1 | 3/2004 | Bartesch et al. | | |
| 7,472,948 B2 * | 1/2009 | Yatabe et al. | ............. | 296/203.04 |
| 7,591,502 B2 * | 9/2009 | Hedderly | ....................... | 296/198 |

(Continued)

FOREIGN PATENT DOCUMENTS

DE 19616672 A1 10/1997

(Continued)

*Primary Examiner* — Glenn Dayoan
*Assistant Examiner* — Gregory Blankenship
(74) *Attorney, Agent, or Firm* — Ingrassia Fisher & Lorenz, P.C.

(57) ABSTRACT

A frame structure is provided for the underbody of a self-supporting motor vehicle bodywork. The frame structure includes, but not included with an elongate tunnel and two sillboards parallel hereto. The sillboards are disposed on both sides of the tunnel. The frame structure also includes, but is not limited to a dashboard cowl with closing plate, which is connected directly to both sillboards and the tunnel, a wheel housing with a downwardly open main structural arc, the ends whereof are connected to the underbody, and on its side facing the underbody (e.g., the vehicle inner side) the main structural arc has a damper receptacle in its upper area, from which a supporting strut connected to the underbody projects downward.

20 Claims, 9 Drawing Sheets

U.S. PATENT DOCUMENTS

| | | | |
|---|---|---|---|
| 7,810,875 B2 * | 10/2010 | Gerisch | 296/193.07 |
| 7,828,370 B2 * | 11/2010 | Ohi et al. | 296/187.08 |
| 7,866,738 B2 * | 1/2011 | Andou et al. | 296/198 |
| 2007/0126264 A1 * | 6/2007 | Mizuma et al. | 296/204 |
| 2007/0138837 A1 * | 6/2007 | Tomioka | 296/203.04 |
| 2008/0007093 A1 * | 1/2008 | Andou et al. | 296/193.08 |
| 2009/0289476 A1 * | 11/2009 | Bufe et al. | 296/204 |
| 2010/0156146 A1 * | 6/2010 | Matsuyama | 296/193.07 |
| 2011/0043001 A1 * | 2/2011 | Kim | 296/198 |

FOREIGN PATENT DOCUMENTS

| | | |
|---|---|---|
| DE | 69507073 T2 | 5/1999 |
| DE | 19917177 A1 | 10/2000 |
| DE | 10251423 A1 | 5/2004 |
| DE | 60025578 T2 | 9/2006 |
| DE | 102006052992 A1 | 5/2008 |
| DE | 102007035495 A1 | 1/2009 |
| DE | 102007056854 A1 | 5/2009 |
| WO | 2005056372 A1 | 6/2005 |

* cited by examiner

FRAME STRUCTURE FOR A MOTOR VEHICLE

CROSS-REFERENCE TO RELATED APPLICATION

This application claims priority to German Patent Application No. 102008020527.3, filed Apr. 24, 2008, which is incorporated herein by reference in its entirety.

TECHNICAL FIELD

The invention relates to motor vehicles, in particular automobiles and the bodywork thereof.

BACKGROUND

A self-supporting motor vehicle bodywork has an underbody which terminates the passenger compartment at the bottom, which underbody is connected to the roof by means of vertical struts, usually known as A, B, and C columns. The underbody itself has a plurality of modules, which are conventionally welded together as sheet metal parts in the course of production. These include, inter alia, side skirts, seat cross-members, seat supports, and the tunnel. Located between these modules extending in the longitudinal direction of the vehicle are floor panels, that is, in the front bodywork area, i.e. approximately below the front seats, a front floor on both sides of the tunnel, in the central bodywork area behind the heel plate the rear floor and in the rear bodywork area behind the rear axle cross-member the rear floor extension with the spare wheel well.

The documents DE 10 2007 056 854.6, DE 10 2007 035 495.0, and DE 10 2006 052 992.8, still unpublished at the priority date of this application, describe a frame structure for a motor vehicle, a wheel housing, or a front floor for a front floor of a motor vehicle.

The D-LFT method, also known as direct LFT method, is a generally known method for plastics processing. LFT stands for long-fiber-reinforced plastic. In the D-LFT method a matrix of a thermoplastic material is plasticized in an extruder and blended in a mixer with shortened-length continuous fibers. The fiber-containing plasticized material is then pressed (directly) into shape. The result is a fiber-plastic composite having a plastic matrix, in which long fibers are embedded. Due to the use of an extruder, the fiber length can generally be between about 1 mm and about 50 mm.

It is at least one object of one embodiment of the invention to provide a self-supporting motor vehicle bodywork having a low weight. In addition, other objects, desirable features, and characteristics, will become apparent from the subsequent summary and detailed description, and the appended claims, taken in conjunction with the accompanying drawings and this background.

SUMMARY

A first embodiment of the invention relates to a frame structure for the underbody of a self-supporting motor vehicle bodywork, for example, a self-supporting automobile bodywork. This comprises an elongate tunnel and two sillboards parallel hereto. The two sillboards are disposed to the left and the right of the tunnel. Furthermore, the frame structure has a dashboard cowl with closing plate, which is connected directly to both sillboards and the tunnel. The frame structure furthermore has a rear and/or front wheel housing with a downwardly open main structural arc, the ends whereof are connected to the bodywork floor or underbody. The main structural arc has approximately the shape of a downwardly open U and defines an envelope curve for the rear or front wheel to be surrounded. In this case, on its side facing the underbody, subsequently also called vehicle inner side, the main structural arc has a damper receptacle in its upper area, from which a supporting strut connected to the underbody projects downward. The supporting strut thus runs on the inner side of the vehicle when the wheel housing is mounted in the vehicle and serves to better absorb the forces introduced into the damper receptacle by the chassis. Two such supporting struts can also be provided for the symmetric introduction of forces.

The frame structure is used to receive the floor cladding and thereby to also receive the front floor. The tunnel of the frame structure comes to lie centrally in the vehicle in the longitudinal direction of the vehicle, and the sillboards run externally on both sides of the tunnel. In the front area of the front floor, this is bordered by the tunnel, by a sillboard and by the dashboard cowl. Further back in the longitudinal direction of the vehicle, the heel plate running transversely to the tunnel is connected to the tunnel on the one hand and on the other hand to the sillboards by means of respectively one gusset. As a result, the front floor is bordered over its entire periphery by the frame structure. In view of the absence of the vertical offset between the sillboards and the dashboard cowl usual in the prior art, it is in this way possible to select a front floor, which is connected to its bordering frame structure. The front floor can consist of sheet metal or of plastic. The last-mentioned choice leads to a considerable saving in weight with the same structural stability in the event of a frontal or side impact. The static stability and the fatigue behavior are ensured by the frame structure to the same extent as in a bodywork according to the prior art. The saving in weight leads to a lower fuel consumption of the vehicle and therefore to lower environmental pollution through emissions.

The wheel housing assigned to the frame structure and also its subsequently described modifications completely depart from the known approach to select a wheel housing with closed plates or to select a plate shell design for this. Rather, while analyzing the desired functions of the wheel housing, a strut structure was selected whereby these desired functions are fundamentally ensured and in addition can be fulfilled even more reliably due to their precise detection. In addition, the strut structure allows a considerable saving of material and weight compared with a conventional shell structure, which is about 50% in the variants which can be used in practice. The savings of weight and fuel for a motor vehicle having this wheel housing can be clearly seen.

The aforesaid C-column is selected alternatively to the wheel housing or cumulatively hereto. The C-column vehicle region possesses an inner plate (also called inner side wall) and an outer plate (also called outer side wall) and an interposed C-column reinforcement and as is generally usual, serves the purpose of connecting the substructure to the roof frame. Since the C-column reinforcement is configured as a striker reinforcement for mounting a striker of a vehicle pivoting door, on the one hand fewer parts need to be held in stock in the warehouse and assembled. On the other hand, assembly steps and therefore costs are saved, as well as weight due to unessential fastening means such as screws etc.

In summary, the above combination of the frame structure with the wheel housing makes it possible to provide a very light motor vehicle bodywork with comparable structural stability compared to a bodywork in sheet metal design.

In a second embodiment, the dashboard cowl is adhesively bonded to a front floor made of fiber-reinforced plastic. With reference to the explanations from the middle paragraph on the previous page, the front floor can additionally be adhesively bonded to the tunnel, a heel plate running transversely to the tunnel, and a sillboard. The front floor of fiber-reinforced plastic reduces the weight of the bodywork, as explained above. In this case, as should be expressly emphasized, the saving in weight is not at the expense of a reduced structural stability in the event of a frontal or side impact. Furthermore, an underbody cladding to improve aerodynamic behavior can be eliminated or the front floor in the underbody cladding itself.

The front floor is configured to be largely flat since there is no vertical offset between sillboards and dashboard cowl. Largely flat is intended to mean here that the said vertical offset is less than half the sillboard height. The particularly simple geometry in this respect simplifies the manufacture of the front floor and its assembly.

In a further embodiment, the frame structure has a front floor manufactured at least partially by the D-LFT method. In this respect, the front floor consists at least partially of a fiber-reinforced, in particular long-fiber-reinforced plastic.

The front floor manufactured by the D-LFT method has a lower weight with only moderately higher costs compared to a conventional front floor consisting of sheet metal, with the same structural stability in the event of a frontal or side impact. Conversely this front floor offers the possibility of more easily satisfying the increasingly stringent requirements for motor vehicle bodyworks relating to their structural stability in side or frontal impact tests (e.g., those according to Euro NCAP). This is achieved with the same weight, for example, by combining higher-strength steels in sufficient material thickness with the light front floor manufactured by the D-LFT method.

Embodiments of the front floor have a floor panel comprising glass fibers, carbon fibers, or natural fibers. are provided as fibers for the front floor. High-strength aramide fibers such as those used in the safety field can also be used for the front floor.

Investigations have shown that in embodiments in which the average fiber length was between about 20 mm and about 40 mm, the front floor on the one hand can be produced efficiently by the D LFT method and on the other hand, a structural stability can be achieved by means of the fibers which is equally good or better than that of sheet metal designs. Best results are obtained with fiber lengths of about 1 inch (25.4 mm). With smaller fiber lengths, going into the single-digit millimeter range, the structural reinforcement due to the fibers becomes increasingly less whereas longer fibers are increasingly difficult to process in the extruder.

In a further embodiment, polyamide (PA for short) or polypropylene (PP for short) are selected as the material. In the case of polyamide, on account of its good temperature stability it is possible to pass the bodywork with mounted front floor through a painting line without this suffering temperature-induced damage. In this way, established process sequences which have been developed for the production of sheet metal bodyworks need not be changed. This avoids additional costs which would otherwise have arisen due to changing over production sequences. Polypropylene is a cheaper material than polyamide and, on account of its lower temperature stability, necessitates installing the front floor after passing through the painting line. The installation is effected, for example, by adhesive bonding.

Further embodiments of the front floor have a fiber fraction between about 20 wt. % and about 40 wt. %. Good results were achieved in this respect with PA6.6/GF30 or PP/GF30. The fiber fraction is a compromise in this case. Below about 20 wt. %, the stability of the floor panel is unsatisfactory. Above about 40 wt. % the floor panel is too heavy, and at the same time its manufacturability deteriorates.

One embodiment of the frame structure further provides a front floor which is connected to a seat mounting made of plastic in a seamless manner. With the thus ensuing one piece configuration of front floor and seat mounting, assembly steps are eliminated, which reduces manufacturing costs and shortens manufacturing time. At the same time, the mounting holes for the seat mounting thus have a well-defined position with narrow tolerances, which is not the case with the conventional sheet metal design. This enables simplified mounting of the vehicle seats. Due to the one-piece configuration, a functional integration can largely be undertaken and for example, various fastening elements such as seat supports etc. can be integrated in the front floor.

It is also possible to possible to manufacture the seat mounting together with the floor panel in the D-LFT method and thus manufacture the floor panel and the seat mounting simply and inexpensively in one operation.

In a further embodiment, the dashboard cowl is welded or punch riveted to the sillboard and/or the tunnel. The connection of the dashboard cowl to the sillboard and tunnel is therefore made in a direct manner and via established machining techniques.

It can further be provided that an extruded profile is selected as the sillboard. This profile is one-piece and closed and requires fewer joining operations for its manufacture than the two-part top hat section with closing plate which is frequently used.

In a further embodiment, the frame structure has a steel having a yield point of at least 500 MPa. In this respect, this comprises a high- or superhigh-strength steel, which helps to compensate for the lower structural stability of a front floor consisting of plastic compared with the prior art.

Two gussets made of die-cast aluminum can be provided for the frame structure for connecting the rear floor, each connected to the heel plate and a sillboard. The gusset manufactured by the Vakural casting method is weldable and can therefore be connected to the steel components of the frame structure, for example, by means of friction welding but also by means of punch riveting.

Furthermore, an embodiment can be selected in which aluminum compression cast gussets are provided as gussets and in which the aluminum compression cast gussets are connected to respectively one closed profile.

The two closed profiles then enclose a rear floor extension made of fiber-reinforced plastic. The closed profile provides the rear floor extension with an upwardly closed support surface for support, to which the rear floor can be adhesively bonded. In this case, a high stiffness is ensured with low material usage. A polygonal profile, for example, an octagonal profile, can be selected as the profile.

In a further embodiment, an inner strut projecting downward from the main structural arc is provided on the vehicle inner side. This inner strut together with the supporting strut in the penultimate paragraph then forms the reinforcement for the lower region of the C-column. Shape, position, and alignment of inner strut and supporting strut can then easily be varied thanks to the simple strut geometry and additionally optimized in order to better absorb torsion loads.

Furthermore, an embodiment is provided in which the projecting inner strut has a bolt, and the bolt can either be molded on or inner strut and bolt can be in one piece. This bolt mostly has a horizontally aligned axis and serves as a pivot bearing for a seat back of the vehicle. The bolt is an integral part of component of the wheel housing so that its mounting in the factory is eliminated and the production costs of the vehicle are reduced.

In a further embodiment, a first substantially horizontal connecting strut for connecting the ends of the main structural arc, the supporting strut, and the projecting inner strut is provided. The first connecting strut stiffens the aforesaid strut structure along the subsequent longitudinal direction of the vehicle and further serves to connect the wheel housing to the rear frame of the motor vehicle.

Furthermore, an embodiment can be provided in which the main structural arc has a perpendicularly aligned flange. The flange running over the entire length of the main structural arc or continuous flange defines a boundary between the inner wheel housing, which faces the bodywork floor or the vehicle inner side and which has been described previously, and an outer wheel housing facing the vehicle outer side and which is to be explained subsequently. The inner and the outer wheel housing then form the complete wheel housing. Due to the provision of a flange, it is initially possible to manufacture inner and outer wheel housing separately, which allows inexpensive manufacture in view of the dimensions. The flange then allows the subsequent connection of these two parts and also the connection of the side wall on the inside. Naturally it is also possible to manufacture a one-piece wheel housing directly with correspondingly large forming tools.

It can further be provided that the main structural arc has a projecting outer strut on the side of the flange facing away from the bodywork floor (i.e., on the vehicle outer side, which is connected on one side to a downwardly open outer structural arc, and the outer structural arc has a flange for connection of a side wall outside the motor vehicle). The outer structural arc together with the outer strut defines a first part of the outer wheel housing and with its flange or its flange receptacle, serves for connection of the side wall on the outside. The flange itself need not form an arc in this case, even if this is possible due to the position of the flange at the upper end of the wheel housing opening.

In a further embodiment, a strut running parallel to the main structural arc is provided on the side of the wheel housing facing the vehicle outer side. This strut, which can be connected on the one hand to the projecting outer strut of the penultimate paragraph and on the other hand to another outer strut, is usually disposed in the upper wheel housing area and serves as a flange support for connecting the C-column.

It can furthermore be provided that the outer structural arc is configured in its lower region as a flange support for connection of a rear light.

An embodiment is furthermore possible in which second connecting struts are provided between the ends of the outer structural arc and the ends of the main structural arc. These struts are also used to stiffen the wheel housing and for easier connection to the rear frame.

As has been explained above, the wheel housing consists of an inner and an outer wheel housing. According to a further embodiment, the inner and/or the outer wheel housing or the wheel housing on the vehicle inner side and/or on the vehicle outer side are manufactured in one piece from a light metal compression casting, in particular from an die-cast aluminum. The strut structure of the wheel housing explained above in combination with this choice of material leads to a considerable saving in weight of about 50% (if both halves of the wheel housing consist of die-cast aluminum) with comparable structural stability compared to a wheel housing in conventional shell design.

Naturally it is also possible to combine the strut structure of the wheel housing explained above with the classical shell design. For example, a shell-shaped sheet metal structure connected to the vertical support flange of the main structural arc can be selected on the vehicle outer side and a strut structure as explained above on the vehicle inner side. This procedure makes repair of the wheel housing easier in cases of damage or then makes conventional panel beating possible.

The above embodiments substantially describe the wheel housing in its basic function. The following measures can also be taken for connection of the wheel housing to the motor vehicle. The wheel housing can:

have an integrated tank filler neck receptacle, have an integrated upper rear bench seat mounting, for example in the form of a projecting bolt, have molded on or integrated fastening means for a motor vehicle inner lining, a first aid kit and/or a warning triangle, have molded-on or integrated eyes for tie-down straps e.g. for securing objects to be transported in the trunk, have an integrated spring seat for the rear axle, and/or have an integrated shock absorber receptacle for the rear axle.

A feature common to these precautions is that they are an integrated component of the wheel housing. If a wheel housing is purchased from a supplier, these precautions can be provided already during manufacture and therefore need no longer be mounted in the factory so that the automobile company has less assembly work with lower cots.

Furthermore, a C-column can be fastened to the wheel housing, the C-column reinforcement whereof being configured in one piece with the striker reinforcement.

The C-column vehicle area has an inner plate (also called inner side wall), an outer plate (also called outer side wall) and an interposed C-column reinforcement and serves, as is generally usual, to connect the substructure to the roof frame. Since the C-column reinforcement is configured as a striker reinforcement for mounting a striker of a vehicle pivoting door, on the one hand fewer parts need to be kept in stock in the warehouse and integrated. On the other hand, assembly steps and therefore costs are saved but also weight due to inessential fastening means such as screws.

In one embodiment, the C-column reinforcement consists of tailored welded blanks. A greater material thickness or sheet metal thickness and optionally a higher material quality is then provided for the striker reinforcement.

With the aid of the tailored welded blanks, a C-column having approximately tailored stiffness properties with limited weight can then be achieved, which optimally withstands a side impact, and at the same time taking into account the desired function of the aforesaid torsion ring, the striker reinforcement is integrated.

In a further embodiment of the frame structure, the C-column consists of tailored rolled blanks. Tailored rolled blanks are produced by flexible rolling of steel sheets followed by die bending, welding, and optionally additional profile bending. Compared to tailored welded blanks, these yield more uniform transitions in material thickness with reduced costs.

A further embodiment further provides a C-column of a patchwork steel sheet. In contrast to a C-column of tailored welded blanks, in this case not rectangular profiles but profiles having a largely free contour are welded together with the result that it is possible to equip the C-column reinforcement locally with a higher material thickness and thereby optimize with regard to its stiffness properties.

A further embodiment of the invention relates to a self-supporting motor vehicle bodywork having a frame structure according to one of the above embodiments.

One embodiment of the invention also relates to a motor vehicle, in particular an automobile, having a frame structure according to one of the above embodiments.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
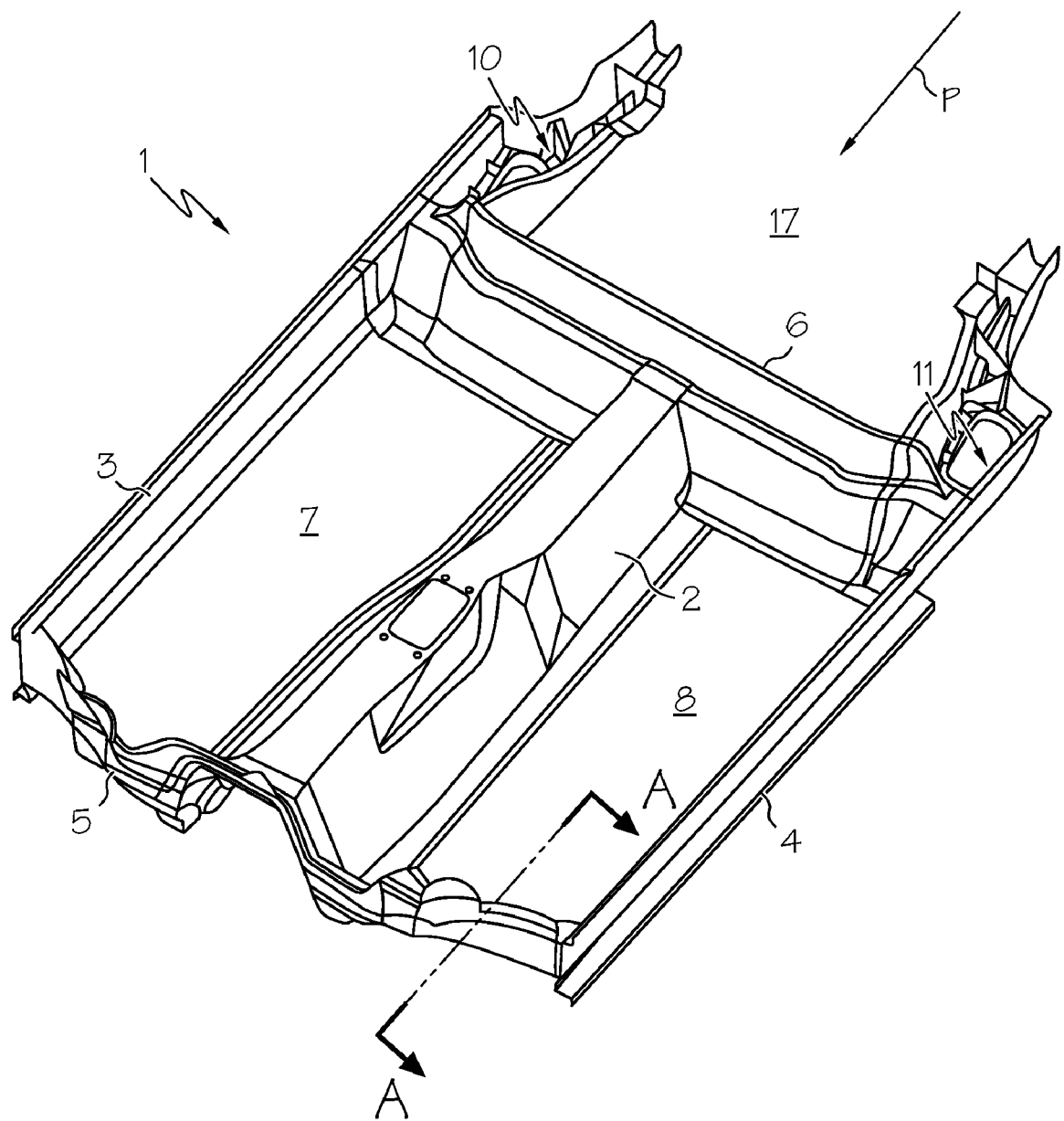
FIG. 1 shows a frame structure in a perspective side view.

FIG. 1 shows a self-supporting frame structure 1 for the underbody of a self-supporting motor vehicle bodywork, which can initially be seen without a wheel housing for reasons of clarity. The arrow P in this indicates the vehicle longitudinal direction, the tip of the arrow pointing toward the front region of the vehicle.

Figure 2:
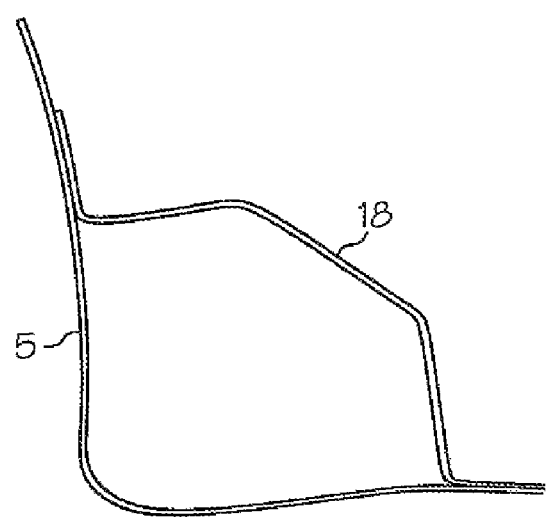
FIG. 2 shows a section A-A through FIG. 1.

The frame structure 1 has an elongate tunnel 2 with two straight sillboards 3 and 4 parallel thereto. A dashboard cowl 5 with its closing plate 18, cf. FIG. 2, is welded on the one hand directly to the tunnel 2 and on the other hand directly with the two sillboards 3 and 4. The tunnel 2 is additionally welded to the heel plate 6, which runs parallel to the dashboard cowl 5. The sillboards 3, 4 are connected via a gusset, in the present case a gusset 10 or 11 of die-cast aluminum, on account of its weldability. The two openings 7 or 8 intended for the front floor right or front floor left, respectively thus have a peripheral and closed edge. It is thus possible to insert into these openings 7 and 8, a front floor consisting of a fiber-reinforced plastic and adhesively bond its edge to the edge of the opening 7 or 8. The overall bodywork is particularly light due to this choice.

Figure 3:
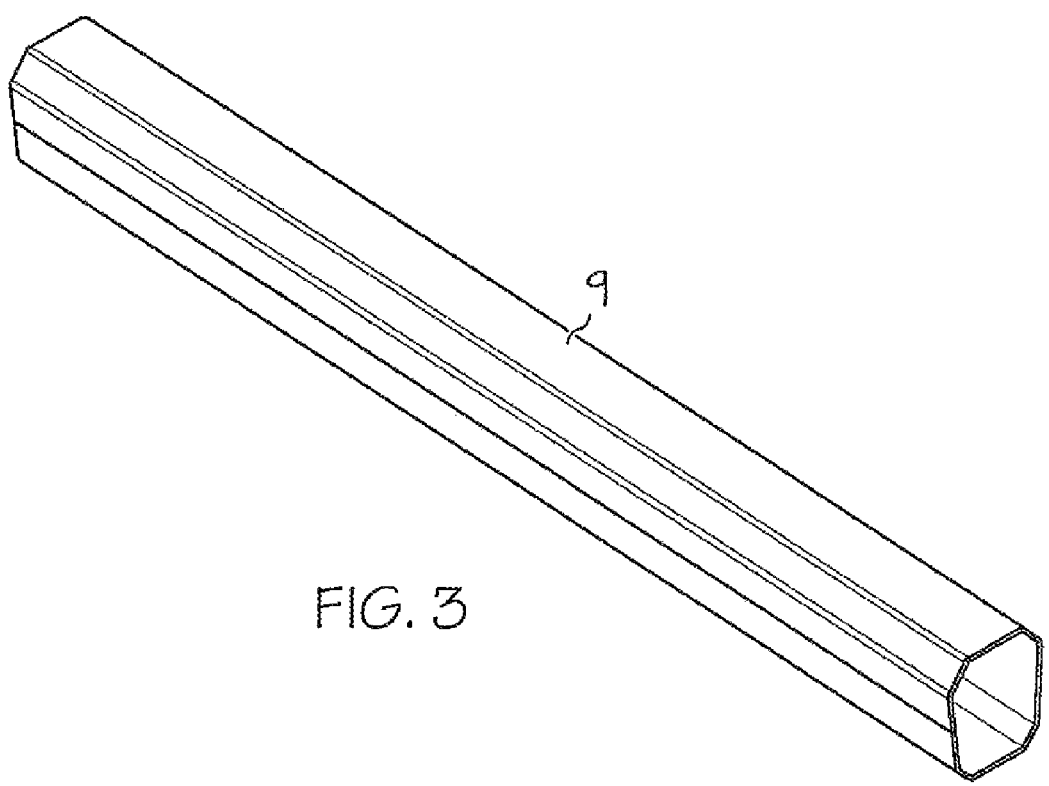
FIG. 3 shows an octagonal profile for bordering the rear floor.

The frame structure 1 is visually similar to a truss frame and has a high-strength steel having a yield point of at least 500 MPa. The rear floor 17 comes to lie in the rear vehicle area behind the heel plate 6, which is bordered on both sides by an octagonal profile 9, cf. FIG. 3. The octagonal profile 9 as a closed profile provides an upwardly closed support surface for a rear floor 17 made of plastic. In this respect, the rear floor 17 can be placed with its edge on the support surface 12 of the octagonal profile 9 and adhesively bonded to this. The octagonal profile 9 is in each case welded to a gusset 10 or 11 of die-cast aluminum and thereby arranged parallel to the sillboards 3 or 4 configured as extruded profiles.

Figure 4A:
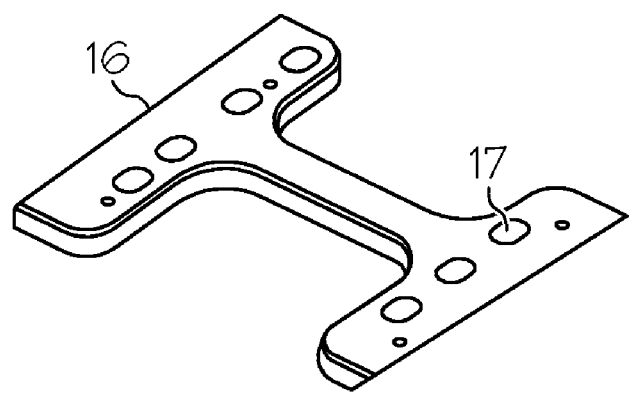
FIGS. 4a-d show a front floor for mounting in the frame structure of FIG. 1.
Figure 4B:
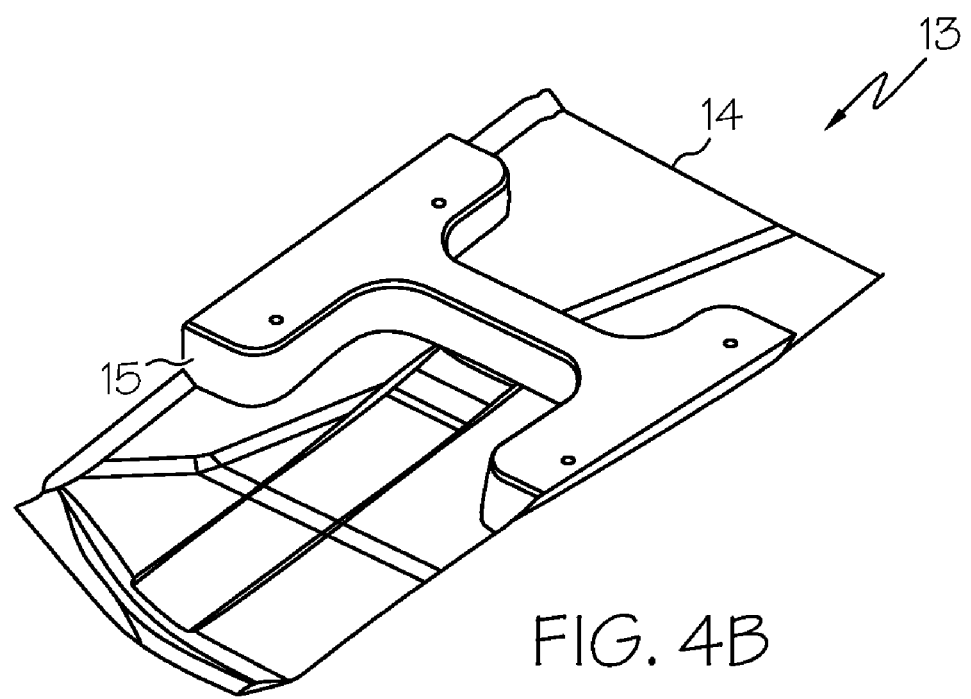
Figure 4C:
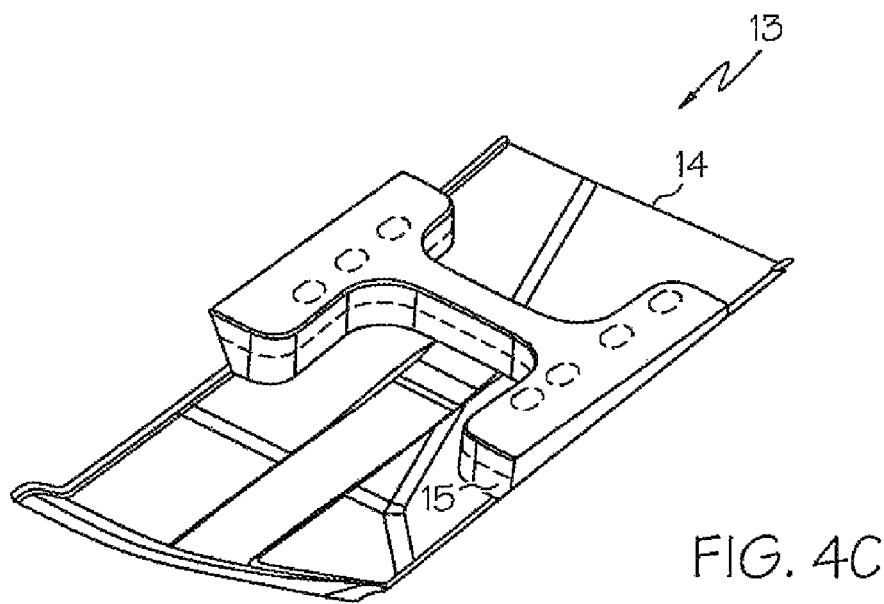

FIGS. 4b and 4c each show a front floor 13 with a floor panel 14 made of a polyamide produced by the D-LFT method. The floor panel 14 has an approximately rectangular cut and consists of PA6.6/GF30 having a material thickness of about 3 mm. The seat mounting 15 is connected seamlessly to the floor panel 14. This was produced in the same operation with the floor panel and in this respect also has PA6.6/GF30. For improving the structural stability in the event of a side or frontal impact, the floor panel 14 further has a metal reinforcement 16 having a thickness of about 0.8 mm disposed on its surface.

FIG. 4a shows such a metal reinforcements 16, which is placed on the seat mounting 15 during assembly and is pressed positively with this or subsequently adhesively bonded. The result of the assembly is shown in FIG. 4c. The metal reinforcement 16 improves the behavior of the floor panel 14 in the event of a side or frontal impact. The metal reinforcement 16 can optionally also be dispensed with.

The metal reinforcement 16 has fastening elements (e.g., mounting holes), for a motor vehicle seat (not shown). Since the scatters in the dimensions in the case of a one-part configuration of floor panel 14 and seat mounting 15 are smaller than for the production of a multipart sheet metal bodywork in which the seat mountings 15 are located on various components, assembly of the motor vehicle seats is made easier.

Figure 4D:
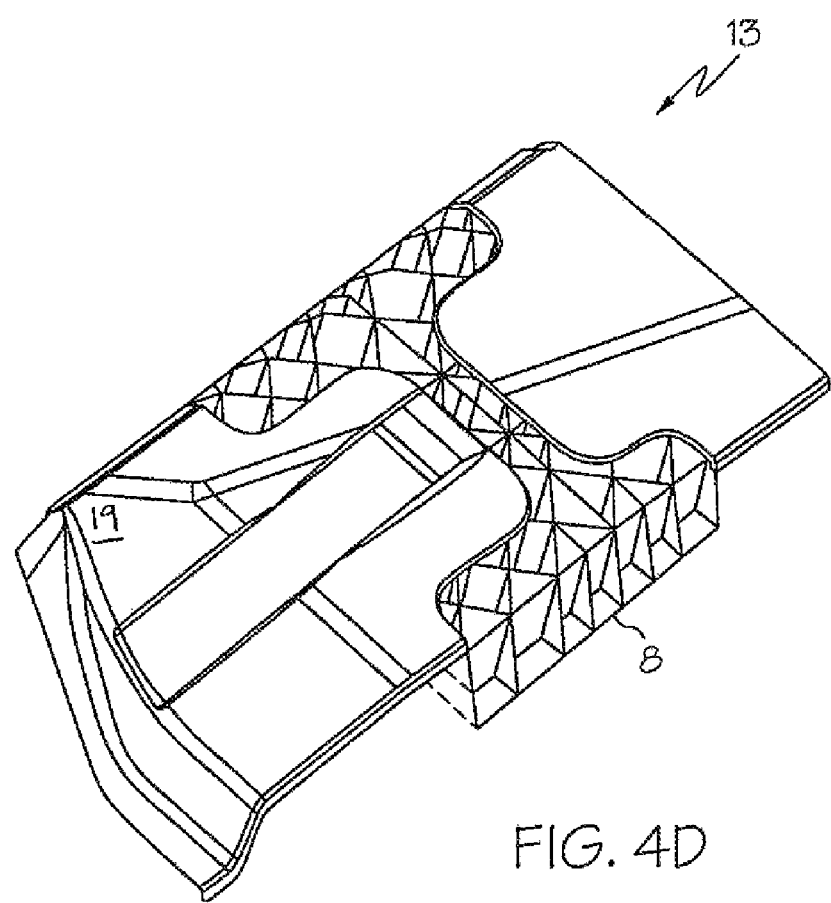

FIG. 4d shows the underside 19 of a front floor 13. This diagram shows the honeycomb structure 80 of the seat mounting 15, whereby material can be saved compared to a solid design and the structural stability can even be improved for the case of a frontal or side impact.

The front floor modules 13 (left or right) manufactured in the D-LFT method are approximately 50% lighter than conventional sheet metal modules. Their use is made possible by the frame structure 1, whose openings 7 or 8 border the modules over their entire circumference and provide the possibility of firmly adhering the modules by means of prepared flanges.

Figure 5:
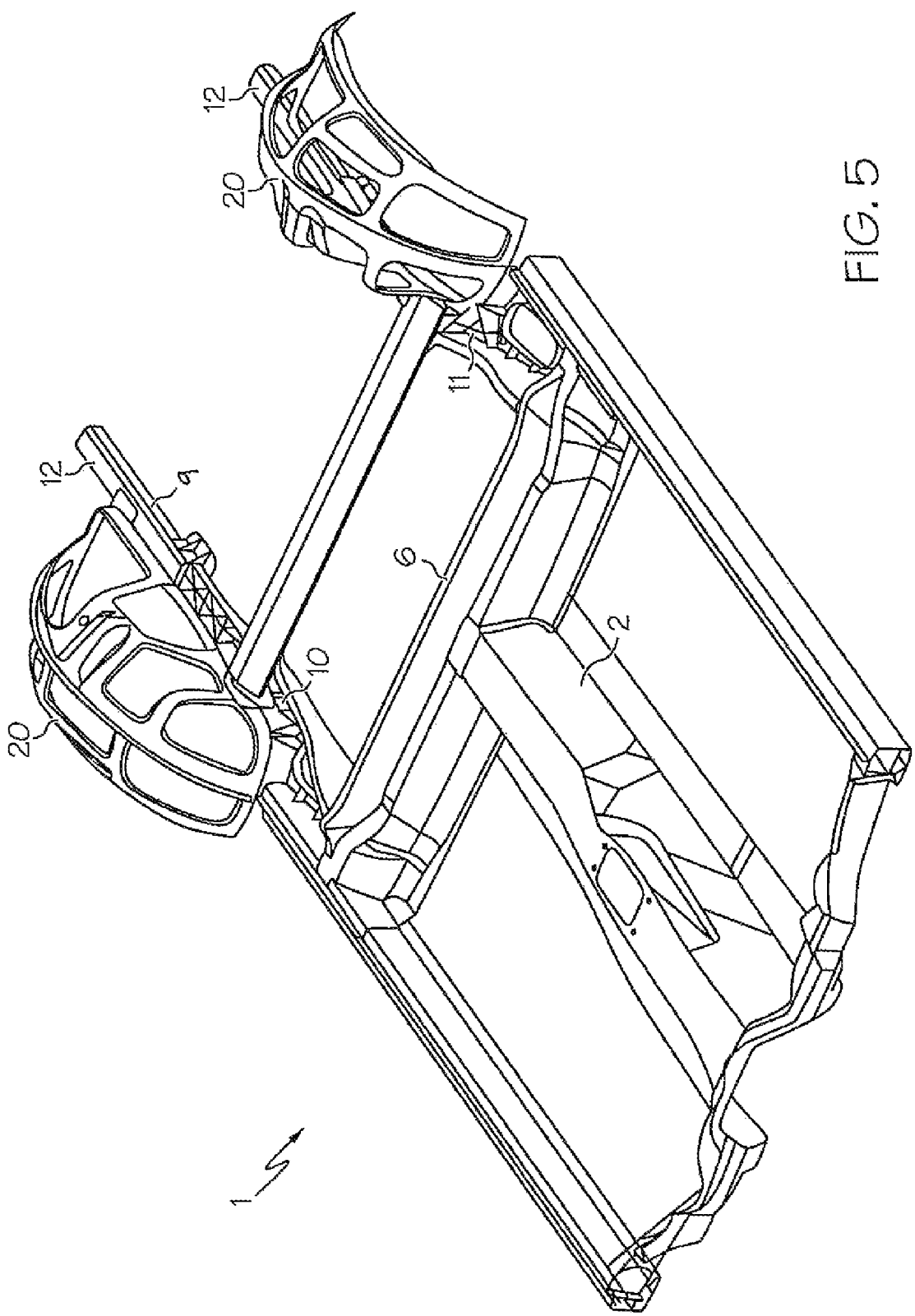
FIG. 5 shows a first embodiment of a frame structure with wheel housing.

FIG. 5 shows the frame structure 1 from FIG. 1, but now supplemented by a wheel housing 20, which is connected on the one hand to the gussets 10, 11 and on the other hand, to the two octagonal profiles 9.

Figure 6:
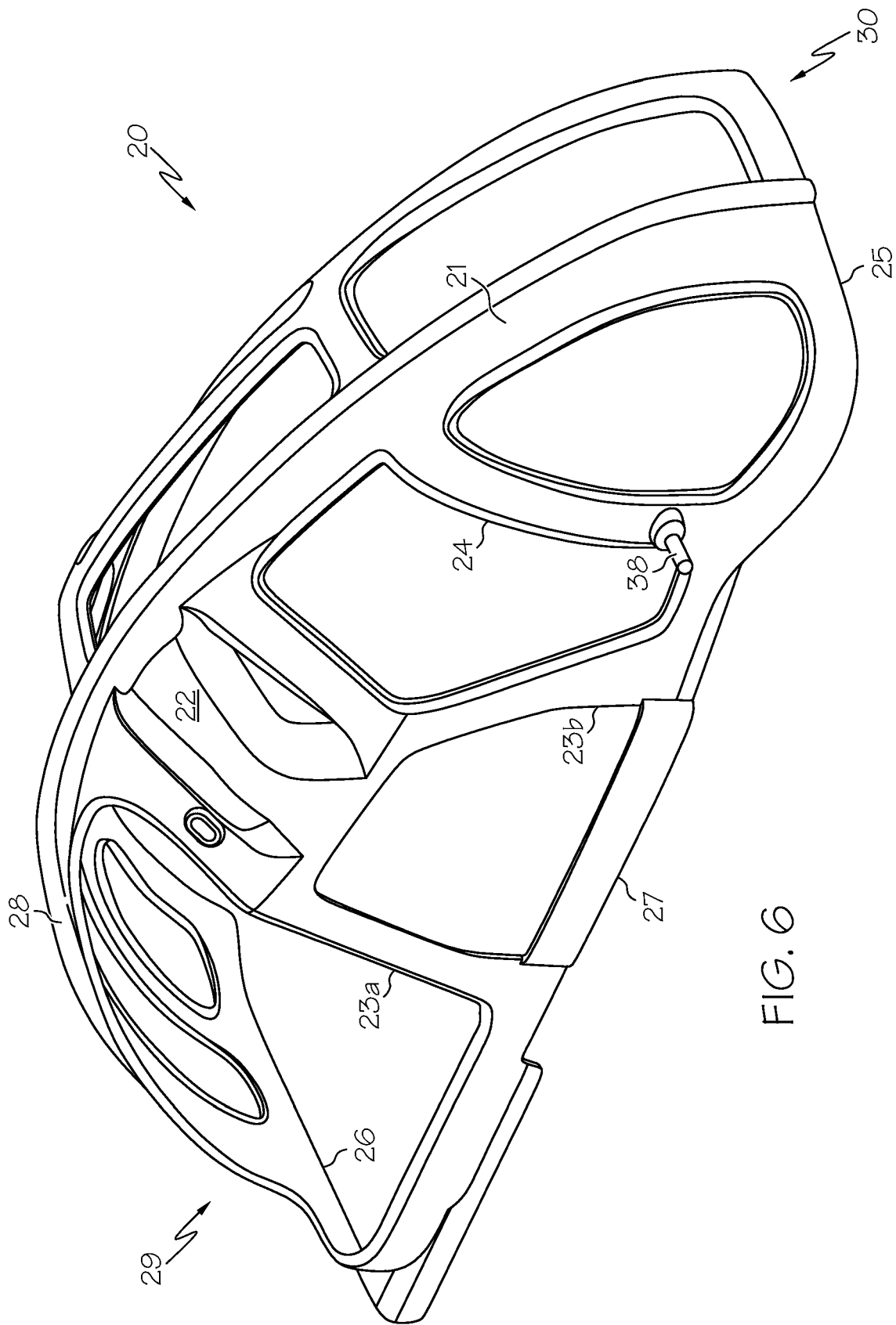
FIG. 6 shows the wheel housing from FIG. 5 viewed from the vehicle inner side.

FIG. 6 shows a wheel housing 20 in detail and specifically, viewed from the vehicle inner side or the passenger compartment, cf. FIG. 5. The wheel housing 20 is manufactured in one piece from die-cast aluminum. A main structural arc 21 can initially be identified, which roughly has the shape of an inverted U, with adjoining damper receptacle 22 in the upper region. In order to be able to better absorb the forces introduced via the suspension struts (not shown), supporting struts 23a and 23b project downwards from the damper receptacle, so that their lower ends can be connected to the rear frame (not shown) during assembly.

Furthermore, the wheel housing 20 has an inner strut 24 projecting downwards from the main structural arc 21. The supporting struts 23a, 23b and the inner strut 24 together form a reinforcement of the lower part of a C-column not shown here. The lower ends 25, 26 of the main structural arc 21 and the lower ends of the supporting struts 23a and 23b as well as the inner strut 24 are connected to a horizontally disposed connecting strut 27. The connecting strut 27 serves to stiffen the wheel housing 20 and for connection to the octagonal profile 9, cf. FIG. 5.

The main structural frame 21 has a perpendicular flange 28 over its entire length. This delimits the part of the wheel housing 20 located in front of the flange 28 from the perspective of the observer, the inner wheel housing 29, from the outer wheel housing 30, which is located behind the flange 28. The designations inner/outer wheel housing are accordingly oriented to the mounting position in the vehicle. If the wheel housing 20 were mounted in the vehicle, it would accordingly be viewed from the vehicle inner side in FIG. 1, cf. FIG. 5.

Figure 7:
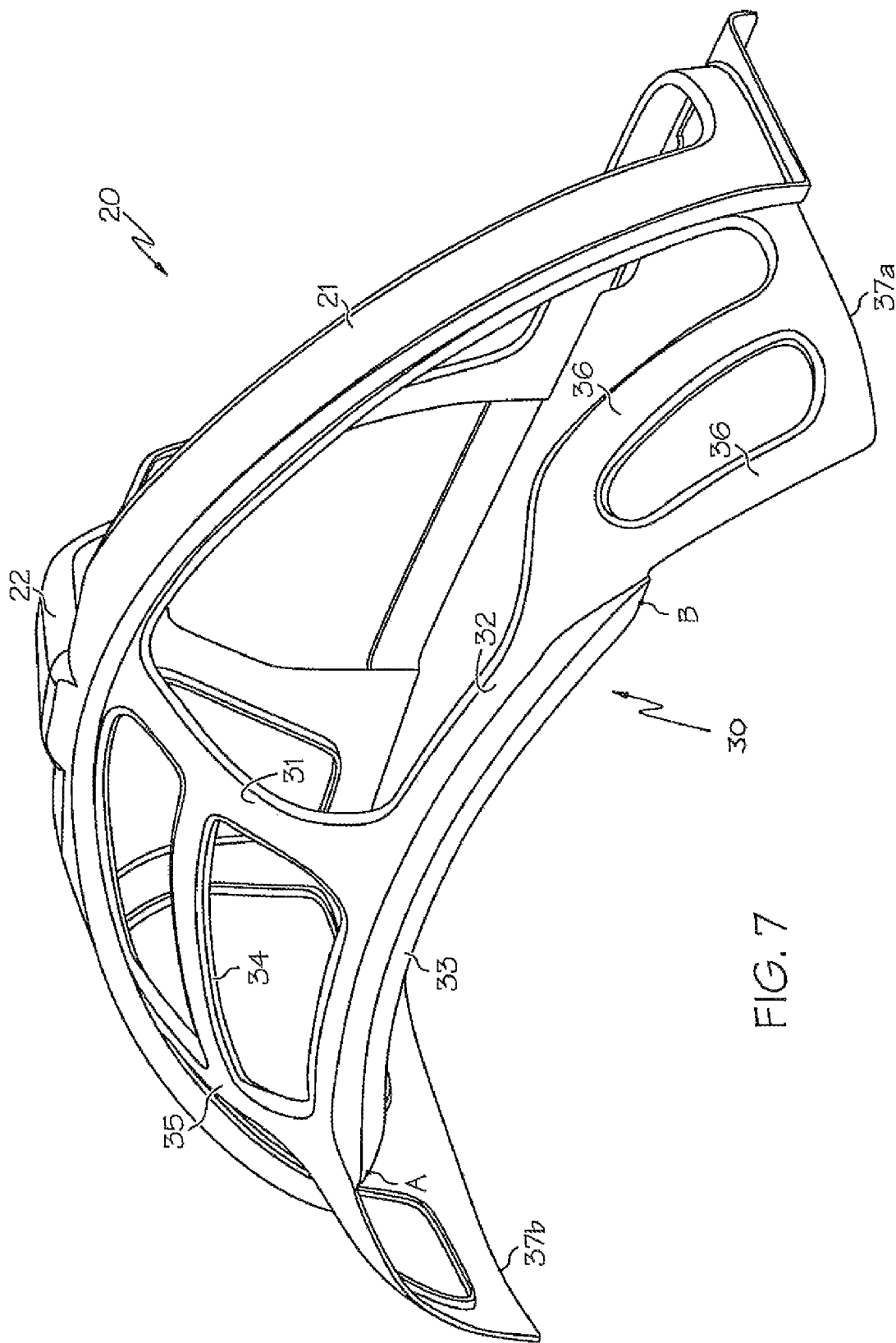
FIG. 7 shows the wheel housing from FIG. 5 viewed from the vehicle outer side.

FIG. 7 shows the wheel housing 20 of FIG. 1 from the rearward side that is primarily the outer wheel housing 30. A projecting outer strut 31 can be seen on this vehicle outer side, which strut is connected at the end to a downwardly open outer structural arc 32, the outer structural arc 32 having a flange 33 for abutment of a side wall outside the motor vehicle (not shown). The flange 33 itself is arcuate and runs approximately from Point A to Point B.

Starting from the outer strut 31, a strut 34 runs parallel to the main structural arc 21 as far as another outer strut 35, which leads from the main structural arc 21 to Point a of the outer structural arc 32. The strut 34 serves as a flange support for connection of the C-column. Furthermore, the outer regions of the outer structural arc 32 or the lower region thereof are or is configured as a flange support 36 for connection of a rear light. The ends of outer structural arc 32 and main structural arc 21 are furthermore connected to one another for stiffening purposes via second connecting struts 37a, 37b, which run horizontally and form a closed ring with the connecting strut 27 of the inner wheel housing 29.

The wheel housing 20 shown in FIG. 6 and FIG. 7 has a die cast aluminum having a material thickness, which lies between about 2 mm to about 5 mm variably distributed over the component. Compared with a wheel housing in shell design having metal sheets about 1 mm thick, it has an about 55% lower weight for the same structural stability. Some of the weight saving, for example, is attributable to the fact that in a shell design, the central reinforcing plate for the damper receptacle 22 has a sheet metal having a thickness of about 2.5 mm whereas in the embodiment shown, for the same or slightly larger material thickness the weight is lower because of the lower specific weight of the die cast aluminum. During manufacture the inner wheel housing 29 and the outer wheel housing 30 were manufactured separately in forming tools and then joined together on the flange 28. The separate manufacture is made for cost reasons because the two wheel housing halves would have required large and therefore expensive forming tools because of their dimensions. If larger forming tools are available, the wheel housing 20 can naturally also be produced in a single operation and also be manufactured in one piece. In both cases, further measures in the sense of claims 27 to 31, for example, the bolt 38 for fastening a seat back can also be integrated, thus saving assembly time in the automobile factory.

Figure 8:
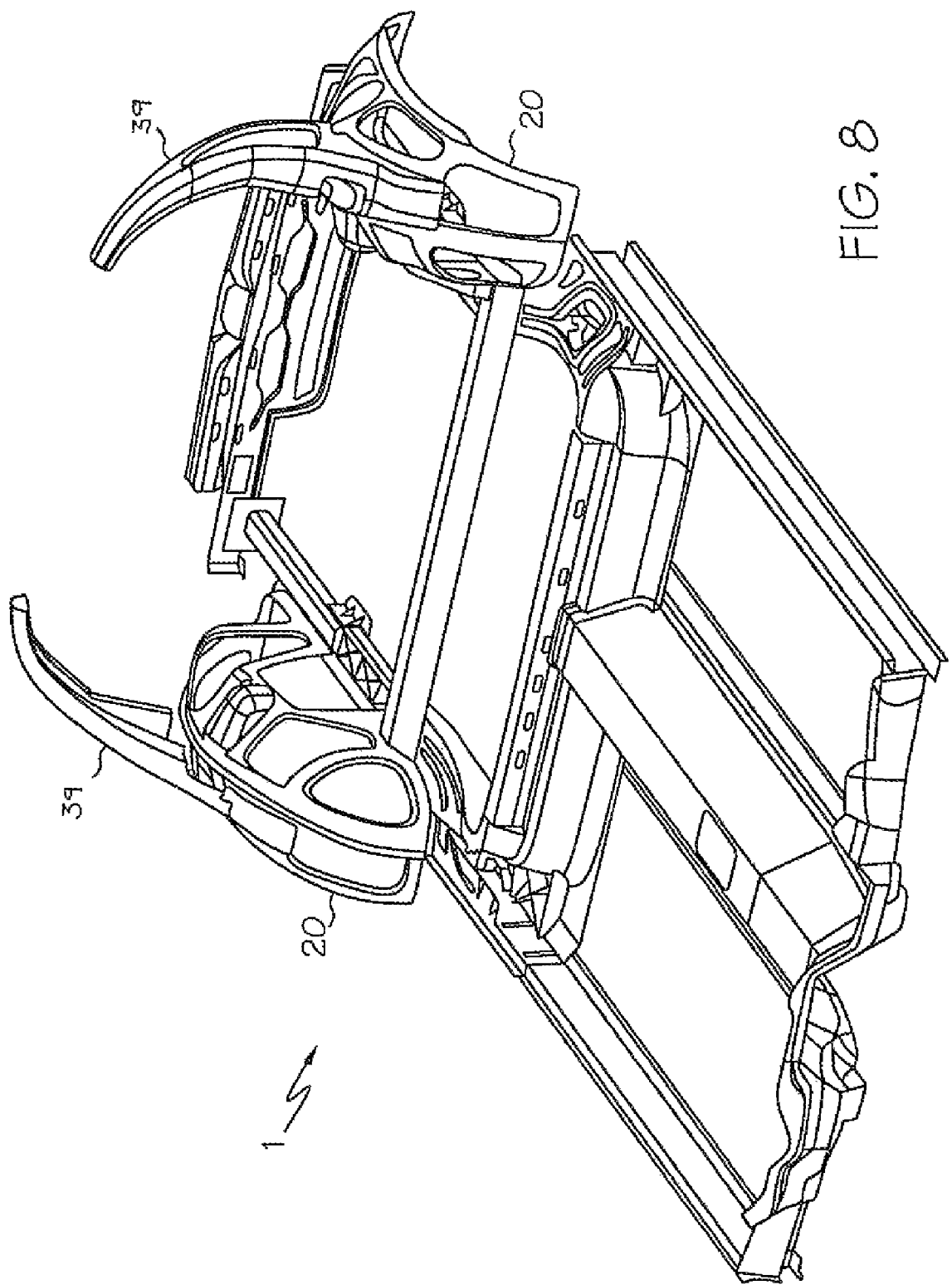
FIG. 8 shows an embodiment of the frame structure with wheel housing and C-column.

FIG. 8 shows the frame structure 1 of FIG. 5, supplemented by C-columns 39 disposed on both sides and each connected to the wheel housing 20. The C-column 39 has an outer plate, an inner plate, and an interposed C-column reinforcement 40, wherein only the outer plate can be seen in FIG. 8.

Figure 9:
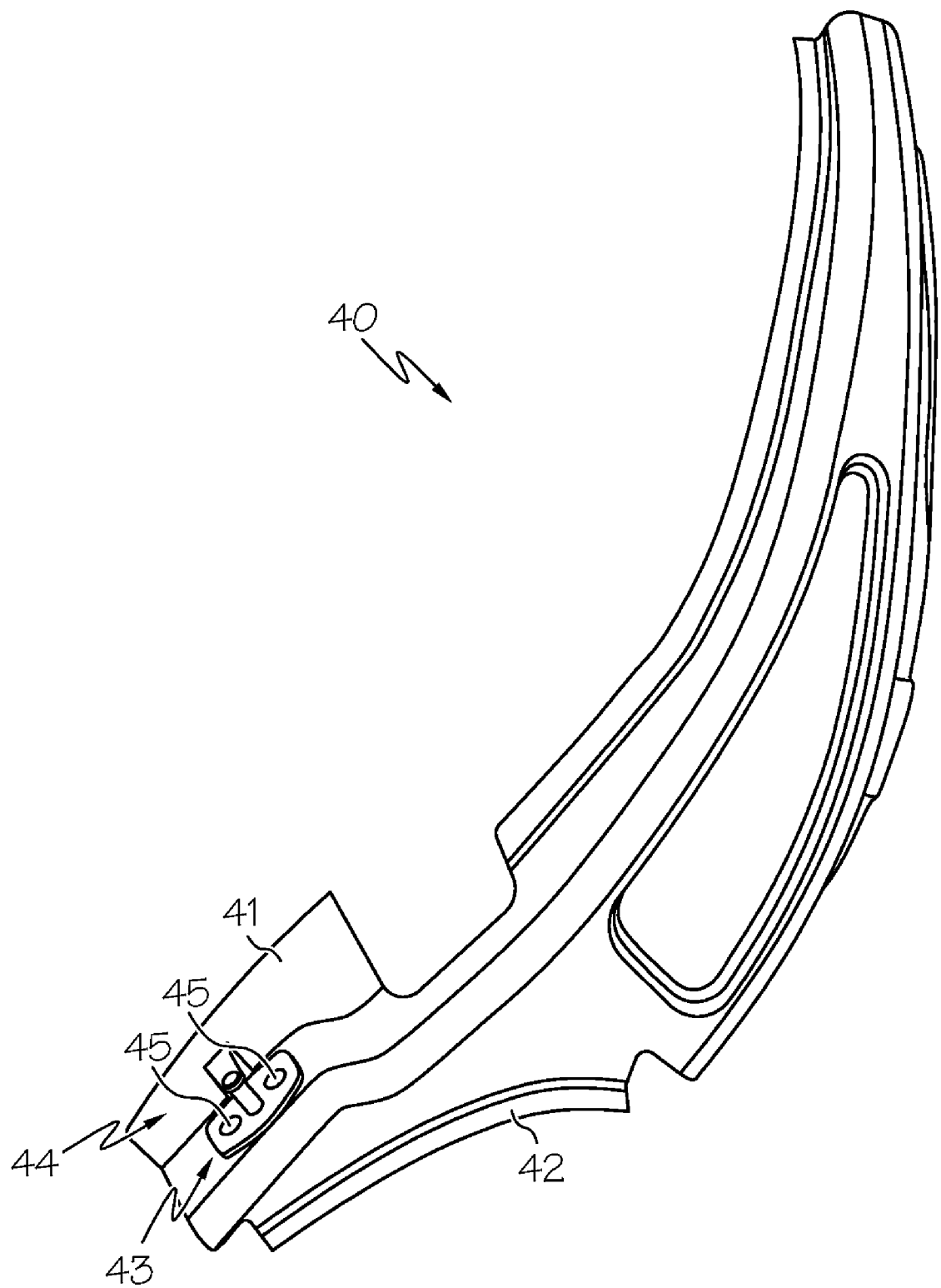
FIG. 9 shows a reinforcement C-column.

FIG. 9 shows the C-column reinforcement 40 in detail. This has a flange 41 for connection of the inner side wall and a flange 42, which is to be connected to a wheel housing 20. The region 43 has a greater material thickness, which is achieved via the thickness of the tailored welded blanks. This serves as striker reinforcement. It can be seen that a striker 44 is firmly screwed to this by means of two screws 45.

Although specific embodiments have been described previously, the person skilled in the art will recognize that the description of these embodiments is not intended to restrict the invention in the specified form. The invention should rather embrace all modifications, equivalents, and alternatives which come within the scope of protection of the claimed invention. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A frame structure for an underbody of a self-supporting motor vehicle bodywork, comprising:
an elongate tunnel;
at least two sillboards parallel to the elongate tunnel and disposed on both sides of the elongate tunnel;
a dashboard cowl with a closing plate that is connected directly to both of the at least two sillboards and the elongate tunnel; and
a wheel housing with a downwardly open main structural arc and ends of the downwardly open main structural arc connected to the underbody,
wherein on a side facing the underbody, the downwardly open main structural arc comprises a damper receptacle in an upper area, from which a supporting strut connected to the underbody is adapted to project downward;
wherein the dashboard cowl is adhesively bonded to a front floor made of fiber-reinforced plastic and located between the elongate tunnel and a sillboard.

2. The frame structure according to claim 1, wherein the front floor is manufactured at least partially by a direct LFT method.

3. The frame structure according to claim 1, wherein the front floor is an at least partially fiber-reinforced front floor.

4. The frame structure according to claim 1, wherein fibers are provided for the front floor.

5. The frame structure according to claim 4, wherein the fibers of the front floor have an average length of between about 20 mm and about 40 mm.

6. The frame structure according to claim 1, wherein a fiber fraction of the front floor is between about 20 wt. % and about 40 wt. %.

7. The frame structure according to claim 1, in which polyamide is provided as a material for the front floor.

8. The frame structure according to claim 1, in which PA6.6/GF30 is selected as a material for the front floor.

9. The frame structure according to claim 1, wherein the front floor is connected in a substantially seamless manner to a seat mounting comprising a plastic.

10. The frame structure according to claim 1, wherein the dashboard cowl is welded to a sillboard.

11. The frame structure according to claim 1, wherein an extruded profile is provided for a sillboard.

12. The frame structure according to claim 1, further comprising a gusset made of die-cast aluminum between a heel plate and a sillboard.

13. The frame structure according to claim 1, further comprising at least two aluminum compression cast gussets connected to the wheel housing and a closed profile and enclosing a rear floor extension made of fiber-reinforced plastic.

14. The frame structure according to claim 13, wherein the closed profile is an octagonal profile.

15. The frame structure according to claim 1, wherein the downwardly open main structural arc of the wheel housing has a projecting outer strut on a vehicle outer side, which is connected on one side to the downwardly open main structural arc, wherein an outer structural arc has a flange for connection of a side wall outside the self-supporting motor vehicle bodywork.

16. The frame structure according to claim 1, further comprising a strut running substantially parallel to the downwardly open main structural arc on a vehicle outer side of the wheel housing.

17. The frame structure according to claim 15, wherein the outer structural arc of the wheel housing is configured in a lower region as a flange support for connection of a rear light.

18. The frame structure according to claim 15, further comprising second connecting struts between ends of the outer structural arc and ends of the downwardly open main structural arc.

19. The frame structure according to claim 1, wherein the wheel housing comprises a shell-shaped sheet metal structure connected to a mounting flange on a vehicle outer side.

20. The frame structure according to claim 1, comprising an eye for a tie-down strap integrated on the wheel housing for a load.

* * * * *